July 13, 1948.  M. P. WINTHER  2,445,095
MOTORING DYNAMOMETER FOR ENGINE TESTING
Filed May 28, 1945
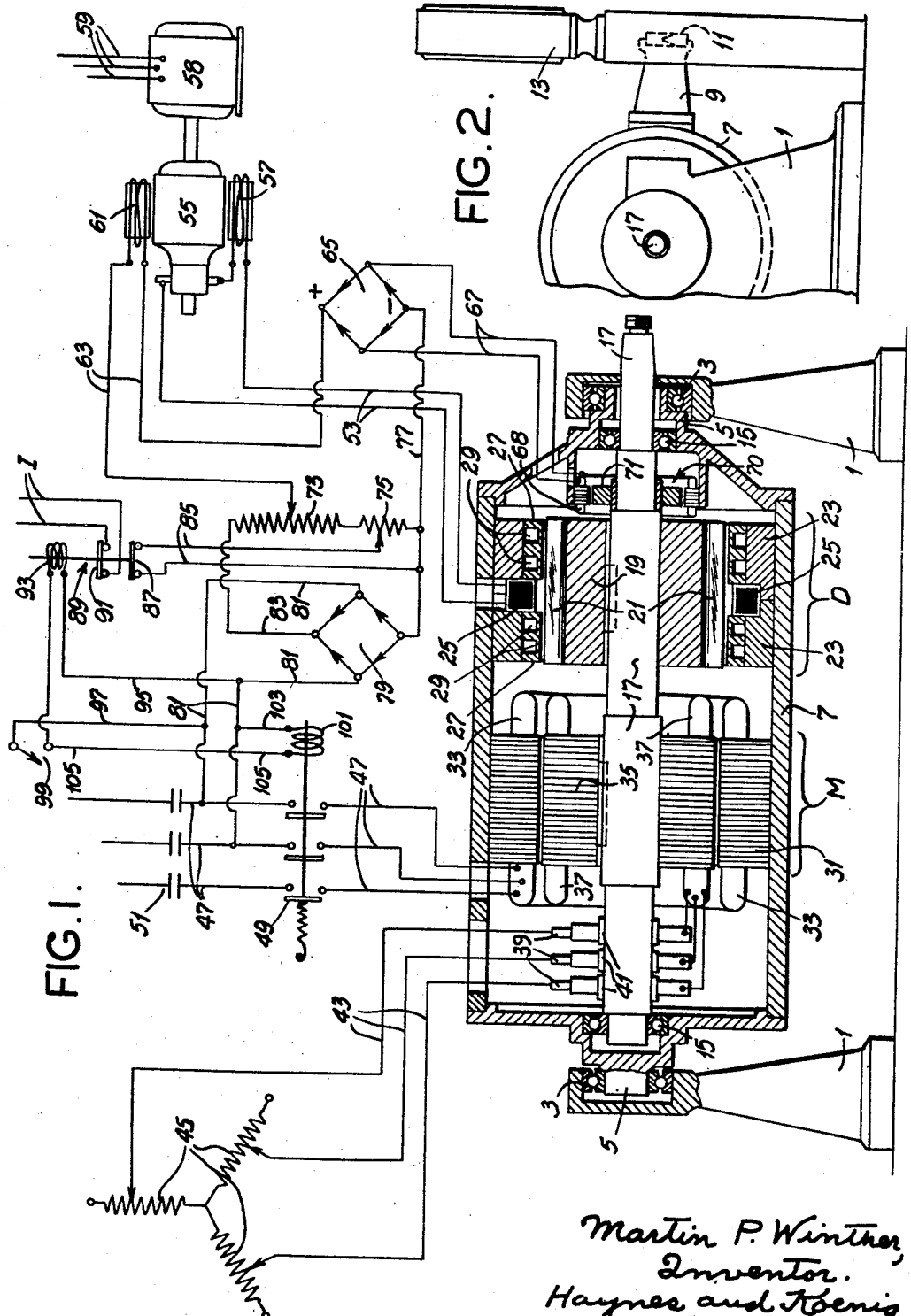
Martin P. Winther,
Inventor.
Haynes and Koenig
Attorneys.

Patented July 13, 1948

2,445,095

UNITED STATES PATENT OFFICE 2,445,095

MOTORING DYNAMOMETER FOR ENGINE TESTING

Martin P. Winther, Waukegan, Ill., assignor to Martin P. Winther, trustee

Application May 28, 1945, Serial No. 596,251

4 Claims. (Cl. 73—116)

This invention relates to electric apparatus, and with regard to certain more specific features, to motor controls and associated dynamometers, brakes and the like.

Among the several objects of the invention may be noted the provision of a motored eddy-current dynamometer unit which, in addition to being useful for absorbing energy from a prime mover or the like, may be used to drive the prime mover either for starting or testing purposes; the provision of a motored dynamometer of the class described which may instantaneously be switched from load-absorbing to motoring test operation; the provision of apparatus of the class described in which an eddy-current, power-absorbing or braking element is controlled so as to function as a governor determining a maximum motoring speed; the provision of apparatus of this class which is compensated for governor droop; and the provision of apparatus of this class which is simple to construct, control and maintain. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which one of various possible embodiments of the invention is illustrated, Fig. 1 is a schematic layout showing a wiring diagram and longitudinal section through the mechanical elements of the invention; and, Fig. 2 is a fragmentary end elevation on a reduced scale of the mechanical parts taken from the right of Fig. 1.

Similar reference characters indicate corresponding parts throughout the several views of the drawings.

Referring now more particularly to Fig. 1, there are shown at numerals 1 pedestals carrying bearings 3 for gudgeons 5 of a dynamometer case 7. This case rocks in the bearings 5 and, as shown in Fig. 2, includes a torque arm 9 connected through a reversible linkage 11 with a force measuring scale 13. Further details of the reversible linkage 11 will not be given since such are common on many dynamometers now in use, their purpose being simply to obtain a reading on the scale 13 in either direction of force application, as determined by the moment of the arm 9. It will be understood that the case 7 rocks freely in the bearings 3 for the limited distance required by the scale movement.

Supported upon bearings 15 within the rocking case 7 is a rotary shaft 17. Keyed to the shaft 17 is a toothed magnetic rotor 19. The teeth of the rotor are indicated at 21. They act as flux-concentrating poles.

Fixed inside of the case 7 is a magnetic stator 23 within which is located an annular electric coil 25 providing a toric flux field interlinking the stator 23 and the rotor 19. Interlinkage is through the teeth 21. Within and attached to the stator 23 are magnetic, eddy-current rings 27 through which said flux field passes. These rings include suitable water-cooling passages 29. Thus if the coil 25 is excited, and the shaft 17 rotated, eddy currents will be engendered in the eddy-current rings 27, thus generating heat which is carried off by the water circulated in the passages 29. The magnetic field from the eddy currents reacts with the field from the coil 25 with resulting torque applied to the rocking case 7. The force of this torque is applied to the scale 15 through the linkage 11. From the scale reading suitable computations may be made for horsepower developed in any prime mover coupled to shaft 17. The action is effective in either direction of rotation of the shaft 17. Hereinafter the entire energy-absorbing dynamometer elements indicated by the brackets shown in Fig. 1 will be referred to as D. A dynamometer element such as D is incapable of turning or motoring shaft 17. Further details of the unit D will be unnecessary, inasmuch as these may be obtained from various U. S. patents on the subject, including 2,197,990, dated April 23, 1940, and 2,220,032, dated October 29, 1940.

At M is generally shown a wound-rotor, induction motor. The stator 31 of this motor is attached to the inside of the case 7. The stator windings are indicated at 33. The rotor 35 is keyed to the shaft 17 and its windings are indicated at 37. These windings, through brushes 39, slip rings 41 and wires 43 are connected with an outside adjustable stepped, wire-wound resistance or rheostat 45. Thus the induction motor M is a so-called wound-rotor, slip-ring motor with an outside resistance circuit for the rotor winding. The purpose of the adjustable resistance is to obtain suitable speed variations under various torque conditions. An A. C. circuit for the stator windings 33 is shown at 47, the same passing through a three-pole control switch 49 and a three-pole line switch 51.

As is known, a wound-rotor motor such as M has a tendency either to speed up or slow down with a change in load. This is because most wire-wound or grid rheostatic arrangements such as shown at 45 have definite steps. If two consecutive rheostat step adjustments produce a difference of 100 R. P. M. in the motor speed, the operator is unable to set the speed of the motor within this difference. Thus if the speed steps required by the rheostat are 800 to 900 R. P. M., an operator would be unable to set the speed of the motor at 850 R. P. M. Liquid rheostats might be used but these are very expensive, cumbersome and their upkeep is difficult. By means of the present invention a precise motor speed may be more conveniently maintained, as will appear.

From the above it is clear that the motor unit M may be used to drive whatever engine or the like (under test) is attached to the shaft 17. This may be desirable, for example, for starting the engine or in order to make a friction test. The reaction of the motor stator 31 on case 7 tends to apply a torque force to the scale 13. Thus, for example, friction horsepower may be determined.

An important advantage of the invention is that a very quick switch may be made from operation of an engine as a prime mover delivering energy to the dynamometer D, to motoring of the engine from motor element M, under either of which conditions torque may be computed from suitable readings on the scale 13. This allows the engine tester for example to determine friction horsepower under substantially the same operating conditions as existed under a given power load on the engine.

In order to make quick changes from power-absorbing conditions during which the dynamometer D is operative, to motoring conditions during which the motor M is driving, the circuit shown is used. This consists in an exciter circuit 53 connected to the dynamometer coil 25. This exciter circuit 53 is served by a generator 55. The generator 55 is driven at a constant speed from a motor 58 served by an A. C. line 59.

The generator 55 may be of any high-grade D. C. variety. The one shown is of the series type with a teaser field exciter winding 61 and a series field 57, the latter being in the exciter circuit 53 of the winding 25. If desired, a third and separately excited field may be used for balancing out residual magnetism in the generator but since that is a detail having nothing to do with the invention per se, it is not described. Whether or not it is used depends upon the type of generator employed.

The winding 61 of generator 55 is connected with wires 63. Wires 63 are fed from a bridge rectifier 65 which may be of the electronic type or copper oxide type, the latter being shown for example. This rectifier is fed from an A. C. supply circuit 67, the latter being supplied from the A. C. winding 69 of a permanent magnet A. C. generator 70. The latter is driven from the shaft 17. The permanent magnet of this generator is shown at 71.

The D. C. circuit including the rectifier 65 is connected to generator coil 61 through wires 63, then passes through an adjustable main by-pass resistance 73, an auxiliary resistance 75 and wire 77.

Another rectifier 79 of a type similar to rectifier 65 is fed over circuit 81 from the A. C. main circuit 47. The D. C. circuit for the rectifier 79 is completed through wire 83, resistances 73, 75 and a part of said wire 77. The voltages from the rectifiers 79 and 65 are in opposition.

Although both the rectifiers 79 and 65 are indicated as being of the copper oxide type, it is to be emphasized that vacuum tube rectifiers may be used for either or both, as desired.

Part of the resistance 75 may be shunted out by means of a shunt circuit 85 which is under control of element 87 of a magnet switch 89. The amount of the resistance 75 adapted to be cut out by the shunt circuit 85 is variable. A second element 91 of the switch 89 controls an ignition circuit I of, for example, an internal combustion engine coupled to the shaft 17 and under test.

A magnet coil 93 is fed from the circuit 47 by wires 81, 95, 97 and switch 99. Closing of the switch 99 will cause opening of the switch elements 87 and 91.

The switch 49 is under control of a magnet coil 101 also connected across the line 47 through said switch 99. This is done through wires 81, 103, 105, switch 99 and wire 97.

An object of the invention is to use the eddy-current absorption dynamometer D as a governor brake to provide a maximum for the speed obtained by the wound rotor motor M when the device is used for motoring an engine connected for test purposes to shaft 17. This is the engine which has its ignition switch wired into the circuit I.

Assume that for test an engine is connected to shaft 17. Main switch 51 is closed and control switch 99 is open. This allows closing of the ignition circuit I, since element 91 of switch 89 is closed. Switch 49 is open. Let it be assumed that the test engine is operating, thus driving the shaft 17. The A. C. generator 70, through rectifier 65, supplies direct current for the exciter coil 61 of generator 55. Generator 55 then supplies direct current for energizing the coil 25. Thus excitation of coil 25 increases with speed. The energization of coil 25 is controlled by adjusting the resistance 73. Most of resistance 75 is shunted by circuit 85, switch element 87 being closed. Adjustment of the resistance 73 functions to set the speed at which absorption tests are made. The motor M at this time is idle but is ready at any instant to drive the engine whenever the engine ignition and action of the dynamometer D are cut off. Thus an engine may be placed under a test load and operated so that under the load it attains its running temperature and other desired conditions and then a quick change is made from energy-absorbing conditions to motoring conditions, for example, to perform a friction horsepower test.

Change over to motoring is made by closing the control switch 99. This opens the ignition circuit I (see coil 93 and switch element 91) so that the engine will not run under its own power. This also has the instant effect of closing the switch 49 (see coil 101) as well as of opening the switch element 87. The control circuit then operates as follows:

The tendency is for direct current to flow from the rectifier 79 through wire 83 and part of the adjustable resistance 73, then through the generator field 61 via wires 63. Completion of this circuit is blocked at the rectifier 65 because the latter will not permit current to flow from its positive to its negative side. This amounts to the presence of a potential from rectifier 79 to rectifier 65. Thus so long as the voltage applied to the positive side of the rectifier 65 from wire 63 is higher than the positive voltage of the rectifier 65, no current will flow through the generator field 61. However, when the shaft speed 17 is sufficiently high to produce rectified D. C. potential from the rectifier 65, which is higher than the potential in wires 63 from rectifier 79, current will flow from the rectifier 65 through the generator field 61, through the wires 63, resistance 73, returning to the negative side of the rectifier 65 via the resistance 75 and wire 77. Thus the rectifier 65 is the sole exciter for the generator field 61.

Rectifier 79 acts simply as a dam preventing flow of current through the generator field 61 until sufficient voltage is obtained at rectifier 65 to overcome the selected reference voltage as determined by the resistance 73. The result is that while driving the dead engine from the motor M, acceleration may continue until the coil 61 begins to receive current from the rectifier 65, after which the excitation of coil 25 causes the dynamometer D to come into play, acting as a governor brake and finally resisting further increase in speed. The lower the slider on the resistor 73 is located, the lower will be the voltage of the rectifier 65 at which current flows through the generator field 61 and the higher will be the excitation of dynamometer coil 25. The result will be a lower ceiling on motoring speed. Thus the rectifier 79 provides a reference voltage as determined by the resistor 73.

In view of the above it will be seen that an upper limit is placed upon the speed of the shaft 17 when driven by the motor M, as predetermined by the resistance 73. It will be understood that while the engine which is driven from shaft 17 is being motored by the motor M that the motoring torque reaction is registered through the case 7 on the scale 13. This provides means for determining friction horsepower.

The purpose of the additional shunt circuit 85 and adjustable resistance 75 is slightly to change the reference voltage when the device is used for motoring when, of course the eddy-current dynamometer D is much less loaded.

When the ignition of the engine is closed and the throttle opened, the dynamometer D will absorb the full load of the engine which may be from ten to twenty times the load applied to it from the wound rotor motor M. Thus the reference voltage is automatically dropped when the device is operating as an energy-absorbing unit and this voltage is raised when the device is being operated as a motoring unit. For example, let it be assumed that a 25 R. P. M. speed increase is required to change the excitation in the coil 25 of dynamometer D from zero value to full value while being driven from the engine. The speed of the dynamometer will normally change slightly from say one-tenth load to full load. Assume that when motoring the dynamometer load is one-tenth of normal and when absorbing it is normal. This would require of the order of 22 R. P. M. or so difference in speed at the torque-balancing point of the dynamometer. This is referred to as the governing speed. If it is desirable to motor a friction test at exactly the same speed as the machine had when absorbing engine power, the resistance 75 is adjusted to bring this about, the switch element 87 operating automatically to cut the adjusted resistance 75 into and out of circuit. Thus it can be arranged by adjusting resistance 75 so that when a change is made from absorbing to dynamometer operation, no substantial speed change will occur.

It should be observed that the driving action of motor M on dynamometer D, and the brake action of dynamometer D, while motoring, balance out reactively on the case 7. Hence no error due to the speed limiting action of the dynamometer D is introduced in torque measurement during motoring. The net reaction on case 7 while motoring is that due to the idling resistance of the engine connected to shaft 17.

The motor M may also be used for starting the engine by closing the switch 99, which causes closing of the switch 49 and motoring operation. Then after the motor is turning, the switch 99 is opened while the ignition circuit I will be closed and the motor started.

It should be noted that the invention, so far as the control of motor M is concerned, has broader implications. The case 7 may be fixed by means other than a dynamometer scale, for example locked to the pedestals 1. Such a construction would amount to an eddy-current absorbing member or brake coupled to a wound-rotor motor. In such a case the eddy-current brake could be in a separate unit coupled to the motor drive shaft 17. The brake element would simply be for close motor control. In the case of the example above suggested, if the rheostat 45 were capable only of adjustment to 100 R. P. M. intervals of motor speed, the eddy-current brake control would be used to obtain finer speed control of the motor. For example, if the rheostat 45 could only control motor M to say 800, 900, 1,000 etc., R. P. M., the control of the rheostat 73 would effect further speed control between 800 and 900 R. P. M. through the braking action of unit D. For this purpose it makes no difference whether the unit D is acting as what is called an eddy-current brake or an eddy-current dynamometer, the two amounting to the same thing so far as brake control action on the motor is concerned. The duty of the eddy-current brake or dynamometer is then to reduce the motor speed a small percentage throughout the range that it is impossible to control speed from the rheostat 45.

This phase of the invention should not be confused with any attempts to superimpose a brake control for speed control of a motor where the brake is of the hydraulic or friction type. Such braking control is not satisfactory but the present electrically controlled eddy-current brake control is, because such is capable of providing the necessary control over the smaller increments over which a rheostat such as 45 is not capable of control. Although it is true that the eddy-current brake control dissipates some energy in the control process, practically this is very small. For example, if the rheostat 45 were capable of a setting to hold the motor M at 900 R. P. M. and another adjacent setting at 800 R. P. M. the brake control would need only to dissipate a small amount of energy in order to bring the speed down from a 900 R. P. M. setting of the rheostat 45 to a desired motor speed of say 850 R. P. M. Thus the invention also provides in general means for controlling the speed of a wound-rotor motor to a greater degree of accuracy than is obtainable with ordinary stepped resistance rheostats. It also provides a greater degree of stability at a given speed when subjected to changes in load.

In view of the above, it will be seen that the several objects of the invention are achieved and other advantageous results attained.

As many changes could be made in the above constructions without departing from the scope of the invention, it is intended that all matter

I claim:

1. In an electric motoring dynamometer for engine testing, a rocking casing, a rotary shaft therein, a dynamometer element and a motor element each having a rotor on said shaft and a stator connected to the casing, a field coil for the dynamometer element, a D. C. circuit connected with said field coil, a D. C. generator connected with the D. C. circuit for exciting said coil, an exciter coil in the D. C. generator, a circuit for said exciter coil, a rectifier feeding said exciter coil circuit, an A. C. generator driven by the shaft and supplying said rectifier, a second rectifier connected in voltage opposition with said first-named rectifier through an adjustable by-pass resistance whereby an adjustable reference voltage may be set up against flow of current through said exciter coil circuit, a shunt circuit connected around a part of said by-pass resistance for passing current through the exciter coil circuit more easily than through the by-pass resistance, a motor switch controlling excitation of the motor element, an ignition switch controlling ignition of a test engine connected to the shaft, a shunt switch for said shunt circuit, and means for substantially simultaneously opening the motor switch and closing said ignition and shunt switches, and for closing the motor switch and substantially simultaneously opening the ignition and shunt switches.

2. In an electric motoring dynamometer for engine testing, a rocking casing, a rotary shaft therein, a dynamometer element and a wound outside-resistance slip-ring induction motor element, each element having a rotor on said shaft and a stator connected to the casing, a field coil for the dynamometer element, a D. C. circuit connected with said field coil, a D. C. generator connected with the D. C. circuit for exciting said coil, an exciter coil in the D. C. generator, a circuit for said exciter coil, a rectifier feeding said exciter coil circuit, an A. C. generator driven by the shaft and supplying said rectifier, a second rectifier connected in voltage opposition with said first-named rectifier through an adjustable by-pass resistance whereby an adjustable reference voltage may be set up against flow of current through said exciter coil circuit, a shunt circuit connected around a part of said by-pass resistance for passing current through the exciter coil circuit more easily than through the by-pass resistance, a motor switch controlling excitation of the motor element, an ignition switch controlling ignition of a test engine connected to the shaft, a shunt switch for said shunt circuit, and means for substantially simultaneously opening the motor switch and closing said ignition and shunt switches, and for closing the motor switch and substantially simultaneously opening the ignition and shunt switches.

3. A motoring dynamometer comprising a rocking case for measuring torque, a rotary shaft in the case having means for attaching an engine to be tested, a dynamometer element having a stator attached to the case and a rotor attached to the shaft, a motor element having a stator attached to the case and a rotor attached to the shaft, a field coil for exciting the dynamometer element, means for exciting said field coil including a first D. C. circuit, means driven by the shaft for delivering current to said D. C. circuit under a potential according to the velocity of the shaft, adjustable resistance means in said first D. C. circuit, a second D. C. circuit connected in voltage opposition with said first D. C. circuit and through said adjustable resistance providing a reference voltage, a shunt circuit across part of said adjustable resistance, a first switch controlling operation of the motor, a second switch controlling operation of the engine as a prime mover, a third switch controlling said shunt circuit, and means including a fourth switch adapted in one position of the fourth switch substantially simultaneously to close the motor switch and open the second and third switches, said fourth switch when in its other position being adapted substantially simultaneously to open the first switch and close the second and third switches.

4. A motoring dynamometer comprising a rocking case adapted for torque measurement, a rotary shaft in the case adapted for attachment to an engine under test, a dynamometer stator attached to the case, a dynamometer rotor attached to the shaft, an induction motor stator attached to the case, a rotor for said motor attached to the shaft, said rotor of the motor having an outside variable resistance circuit and its stator being supplied with A. C. an A. C. generator driven from said shaft, a first rectifier energized by said generator, a rectified D. C. circuit supplied by said first rectifier, a field coil for said dynamometer, an exciting generator for said field coil, an exciting field for said generator supplied by said D. C. circuit, an A. C. supply circuit for the induction motor, a second rectifier supplied by said A. C. supply circuit, a second D. C. circuit supplied by said second rectifier and connected in voltage opposition with said first-named D. C. circuit, adjustable resistance means between said circuits, a shunt circuit across a portion of said resistance means, a first switch in the induction motor A. C. circuit, a second switch controlling operation of the engine, a third switch in said shunt circuit, and a fourth switch adapted to close the first switch while opening the second and third switches or to open the first switch while causing closing of the second and third switches.

MARTIN P. WINTHER.

REFERENCES CITED

The following references are of record in the file of this patent:

UNITED STATES PATENTS

| Number | Name | Date |
|---|---|---|
| 1,390,843 | Thompson | Sept. 13, 1921 |
| 1,728,633 | Schmidt | Sept. 17, 1929 |
| 1,749,304 | Scheppmann et al. | Mar. 4, 1930 |
| 1,825,064 | Hobart | Sept. 29, 1931 |
| 2,210,688 | Schmutz | Aug. 6, 1940 |
| 2,277,284 | Winther | Mar. 24, 1942 |
| 2,286,777 | Winther | June 16, 1942 |
| 2,347,037 | Edwards et al. | Apr. 18, 1944 |
| 2,357,201 | Hornbostel | Aug. 29, 1944 |
| 2,378,766 | Garr | June 19, 1945 |
| 2,387,601 | Moyer | Oct. 23, 1945 |